United States Patent [19]
Caldwell

[11] Patent Number: 4,521,004
[45] Date of Patent: Jun. 4, 1985

[54] VIBRATION-ISOLATING MOUNTING WITH LOAD-DIRECTING CHAMFER

[76] Inventor: William F. Caldwell, 3627 S.W. Hamilton Ct., Portland, Oreg. 97221

[21] Appl. No.: 437,157

[22] Filed: Oct. 27, 1982

[51] Int. Cl.³ ............................................... F16F 1/36
[52] U.S. Cl. .................................................. 267/141.4
[58] Field of Search .................... 267/141, 141.1–141.7

[56] References Cited

U.S. PATENT DOCUMENTS

| | | | |
|---|---|---|---|
| 2,893,722 | 7/1959 | Beck | 267/141 X |
| 3,350,042 | 10/1967 | Stewart et al. | 267/141.4 |
| 3,675,881 | 7/1972 | Caldwell | 267/141.4 |

FOREIGN PATENT DOCUMENTS 608671  10/1960  Italy ................................. 267/141.4

*Primary Examiner*—Duane A. Reger
*Attorney, Agent, or Firm*—Kolisch, Hartwell and Dickinson

[57] ABSTRACT

A bushing-sleeve combination for a vibration-isolating mounting. The bushing takes the form of a resilient, generally cylindrically shaped elastomer having a uniform-diameter axial bore. A hollow, cylindrical metal sleeve is fixed within the bore. The bushing includes an outwardly radiating flange portion adjacent one end of a cylindrical body portion, and an outside-surface-tapered portion joined to the other end of the body portion. When mounted in place, the bushing is compressed axially, and under this circumstance, the unique differential-diameter characteristics of the body portion and the tapered portion cause the tapered portion, and the lower part of the body portion, to flare and bulge outwardly in a manner seating the bushing-sleeve combination so as to assure maximum-performance behavior.

2 Claims, 2 Drawing Figures

VIBRATION-ISOLATING MOUNTING WITH LOAD-DIRECTING CHAMFER

BACKGROUND AND SUMMARY OF THE INVENTION

This invention pertains to a vibration-isolating mounting for absorbing vibrations transmitted from a machine, such as an engine, to a supporting structure. More particularly, it pertains to a novel bushing-sleeve combination used for such a purpose.

Resilient elastomeric bushings, used in combination with central metal sleeves, have long been employed as vibration-isolating devices for mounting, as an example, an engine on a supporting frame, or similar structure. The typical bushing includes an elongate cylindrical body, with a flange portion projecting radially outwardly from one end thereof. The bushing has a continuous bore of uniform diameter, axially centered in the cylindrical body, which bore receives a hollow, cylindrical, metal sleeve. The sleeve has a shorter length than the bore, in order to accommodate sufficient bushing compression and compacting during mounting.

A typical engine-mounting procedure, using such a combination, first involves placing such a bushing through the top side of an aperture in the support structure. The aperture is large enough to permit passage of the bushing's cylindrical body, but not the flange, thereby allowing the flange to give hanging support for the body. The base of the engine is then placed on top of the flange, with the flange providing a cushioning support for the engine. A bolt is passed through the bore and sleeve, with its threaded end extending outwardly from the bore adjacent the support structure's lower side. A metal washer fitted over the bolt abuts the bushing's non-flanged end. By tightening a nut on the bolt's threaded end, the washer is forced towards the base of the engine, compressing the bushing. As the bushing compresses, its cylindrical body bulges outwardly and fills the space in and around the aperture. The sleeve provides support for the bushing. Since its length is shorter than the length of the bore in which it is received, the nut can be tightened until the sleeve is constrained between the engine and the washer. At that point, the bushing should be sufficiently compressed to provided a firm mounting support between the engine and support structure.

Obviously, it is critical that the bushing bulge outwardly if it is to provide firm mounting support. A problem, however, with using the typical bushing-sleeve combination in the previously described mounting process, is bushing end-splay as the bushing is compressed. End-splay is undesirable in that it causes failure in the bushing's ability to bulge properly. Such typically occurs when, during compression, the elastomeric cylindrical body portion of the bushing "flows" axially relative to the metal sleeve, with its end splaying outwardly relative to the washer. This particularly becomes a problem after a bushing has been compressed and relaxed several times. An important factor causing end-splay has been that a bushing's body, often, compresses non-uniformly because the body portion's non-flanged end fails properly to transmit mounting forces applied by the washer as a nut and bolt assembly is tightened.

To eliminate this problem, the present invention contemplates a modification of past-standard bushing-sleeve designs. The invention's bushing has a specially tapered, or chamferred, end which transmits axially displaced buckling forces in the bushing body. These forces torque the bushing's body outwardly, ensuring proper bulging as the bushing is compressed.

In addition, a preferred embodiment of the invention contemplates a metal sleeve fixed securely within the bushing. This prevents axial "flow" relative to the sleeve during compression, with the added feature of allowing the sleeve to provide better bulging support.

A general object of the present invention, therefore, is to provide a novel modification of a resilient bushing in combination with a metal sleeve for vibration-isolating mounting which offers the features and advantages outlined above.

More specifically, an object of the invention is to provide a bushing specially configured to cause a buckling torque in the bushing's body, thereby directing the bushing to "bulge" outwardly during axial compression.

Still another object of the invention is to provide, in such a combination, a metal sleeve which is fixed within the bushing so as to enable the sleeve to give improved bulging support to the bushing during compression.

A further object of the invention is to provide a bushing-sleeve combination of the type outlined which reduces fatigue wear in the bushing, thereby ensuring a longer usable life.

These and other objects and advantages which are attained by the invention will become more fully apparent as the following description is read in conjunction with the accompanying drawings.

DETAILED DESCRIPTION OF THE INVENTION

Figure 1:
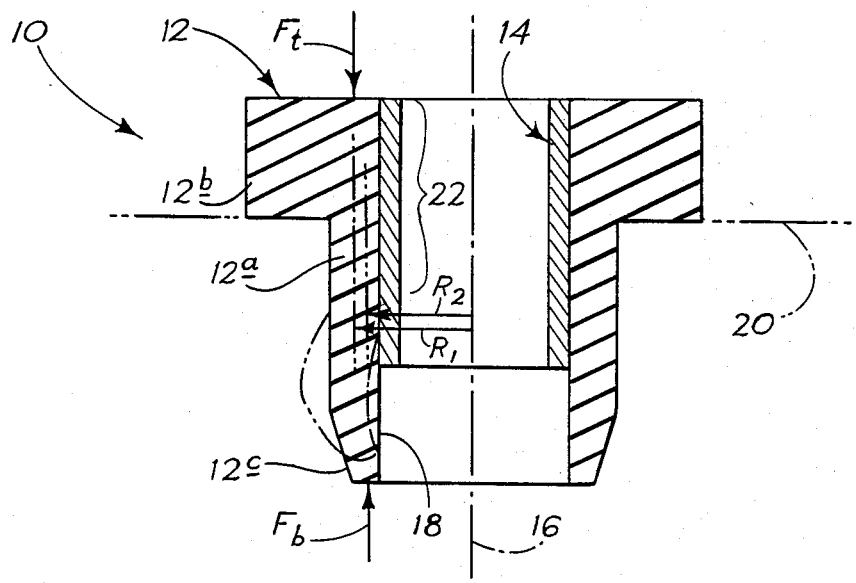
FIG. 1 is a side, axial, cross-sectional view of a bushing-sleeve combination constructed in accordance with the invention, with the bushing therein shown in a relaxed condition.

Turning now to the drawings, and referring first to FIG. 1, indicated generally at 10 is a bushing-sleeve combination constructed in accordance with the invention for providing a vibration-isolating mounting. Combination 10 includes a resilient elastomeric bushing 12, and an elongated, hollow, cylindrical, metal sleeve 14. FIG. 1 shows the combination in a relaxed state.

Bushing 12, which is formed of a suitable conventional elastomeric material, such as those materials now used in conventional bushing-sleeve combinations, includes an elongated, hollow, central, cylindrical body, or body portion, 12a, joined integrally, adjacent its upper end in FIG. 1, with a radially outwardly projecting flange portion 12b. Adjacent its lower end in this figure, body portion 12a joins with a truncated, conical tapered portion 12c. Extending axially along an axis 16 through the bushing is a uniform-diameter bore 18. The outside diameters of body portion 12a and of flange portion 12b are also uniform.

According to an important feature of the present invention, tapered, or chamferred, portion 12c in the bushing coacts with body portion 12a to create what might be thought of as a differential-radius force-transmission relationship which effects a controlled, desirable outward bulging of the lower end of the body portion in FIG. 1 when the bushing is compressed during a mounting procedure (as will be explained). Portion 12c can be seen to have a length which is greater than the thickness of the sidewall of body portion 12a. Considering for a moment a radial cross section in body portion 12a, the same may be taken, for example, in the plane represented in FIG. 1 by dash-double-dot line 20. This plane is normal both to axis 16 and to the plane of FIG. 1. Viewing downwardly in this plane relative to FIG. 1, one would see an annular cross-sectional expanse in body portion 12a having what is referred to herein as a mean radius represented by arrow $R_1$ in FIG. 1. This expanse is referred to herein as a first force-transmitting expanse. An axially directed compressive load in bushing 12 can be thought of of being directed with a cylindrical distribution relative to axis 16 with a radius $R_1$, and such a force is represented by the arrow at the upper left side of FIG. 1 designated $F_t$. The subscript "t" is to indicate that the force now being referred to is directed downwardly from the top of the bushing.

The bottom end of tapered portion 12c in FIG. 1 presents another annular expanse which is concentric with the expanse just described in body portion 12a, and which occupies a plane substantially parallel with that represented by line 20. This expanse, because of the taper in portion 12c has a mean radius represented by arrow $R_2$ in FIG. 1. As can be seen, radius $R_2$ is smaller than $R_1$.

With axial compression of bushing 12, a force directed upwardly against the bottom annular face of tapered portion 12c can be thought of as having a cylindrical distribution with a radius $R_2$, and such a force is represented at the lower left side of FIG. 1 by the arrow designated $F_b$, where "b" stands for bottom.

The way in which the construction just described for bushing 12 contributes to a desired deformation of the bushing when the bushing-sleeve combination is mounted in place will be described shortly.

As can be seen in FIG. 1, sleeve 14 has an overall axial length which is less than the overall axial length of bushing 12. In combination 10, the length of the sleeve is approximately two-thirds that of the bushing. This feature of combination 10 enables appropriate distortion of the bushing as the combination is mounted in place.

In combination 10, sleeve 14 is mounted in a tight or press fit condition in bore 18, with the upper end of the sleeve coplanar with the upper surface of flange portion 12b in the bushing. While, for most purposes, a press fit between the bushing and sleeve is entirely adequate, there are applications where it has been found to be desirable to produce a cement-like bond between the bushing and sleeve along a major portion of the upper length of the sleeve in FIG. 1. Bracket 22 in FIG. 1, which extends for about three-quarters of the length of the sleeve, and for about one-half of the length of the undeformed bushing, represents the length of a preferred axial bonding area where bonding is used.

Considering now how the bushing-sleeve combination of the invention is installed, an illustration is given herein where the combination is used to mount an engine on the frame in a vehicle.

Figure 2:
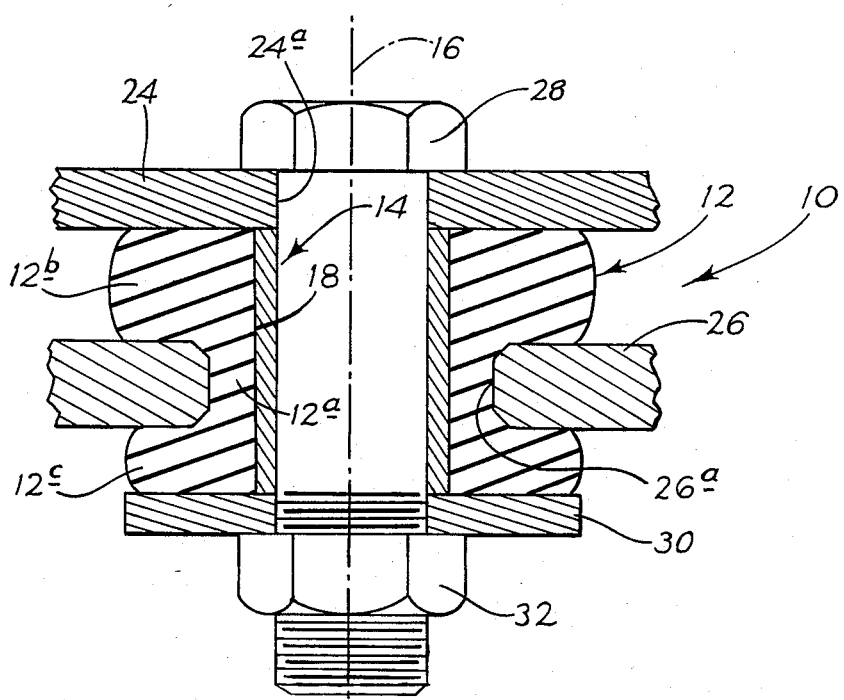
FIG. 2 offers the same point of view as FIG. 1, and shows the bushing-sleeve combination of FIG. 1 in a compressed, operative condition providing a vibration-isolating mounting for an engine on a supporting frame plate.

Referring specifically to FIG. 2, an engine mounting lug is shown at 24 having a bore 24a with a diameter which is substantially the same as the inside diameter of sleeve 14. Disposed below lug 24 in FIG. 2 is a vehicle frame member 26 having a bore 26a which is substantially the same diameter as the outside diameter of bushing body portion 12a.

Mounting begins with placement of the bushing-sleeve combination, in its undeformed state, in a seated condition on frame member 26, with bushing body portions 12a and 12c extending downwardly through bore 26a. The engine which is to be mounted is then placed above the frame member so as to position lug 24 on top of combination 10, with bore 24a axially centered with respect to previously mentioned axis 16.

With the frame member, bushing-sleeve combination and mounting lug so positioned, a bolt 28 is inserted in the aligned bores in the mounting lug and the bushing-sleeve combination, with the lower threaded end of the bolt projecting downwardly below the lower end of bushing 12. A clamping washer 30 is then slid upwardly over the threaded end of the bolt, and a nut 32 is screwed onto the bolt. The nut and bolt assembly is then tightened to draw washer 30 upwardly against the lower end of sleeve 14, with resultant compression and elastic flowing of the bushing to have a compressed or deformed condition as illustrated in FIG. 2.

Referring to FIG. 1 along with FIG. 2, as bushing 12 is placed in axial compression, forces $F_t$ and $F_b$, directed as shown in FIG. 1, act as a couple, and cause the lower end of body portion 12a, and tapered portion 12c, to bulge outwardly as shown in dash-double-dot lines adjacent the lower left side of FIG. 1, thereby forming what is referred to as a rebound shoulder. This bulging, because of the unique tapered-end construction of the bushing, takes place without any outward splaying of the lower end of the bushing. As a consequence, and with continued compression of the bushing with tightening of the nut and bolt assembly, the lower end of body portion 12a, and tapered portion 12c, flow to fill the space between lug 24, washer 30, sleeve 14 and frame member 26, as shown in FIG. 2, at the completion of a tightening operation.

Press fitting, or bonding if such is the case, between bushing 12 and sleeve 14, assists in promoting proper deformation flowing of the lower portion of the bushing during a mounting operation.

With the bushing-sleeve combination in place as shown in FIG. 2, vibrations in the mounted engine are isolated substantially from frame member 26 by virtue of the manner in which the deformed bushing fits between sleeve 14, lug 24, frame member 26 and washer 30. The bushing in the combination has little tendency to flow or rub as it absorbs vibrations, and accordingly offers a very long performance life.

The bushing-sleeve combination of the invention is obviously of very simple construction—one easy to manufacture at relatively low cost. Further, the proposed combination is one which can readily be used as a replacement assembly in conventional mounting situations.

While a preferred embodiment of the present invention has been described herein, it can be appreciated that other variations and modifications may be made without departing from the spirit of the invention.

It is claimed and desired to secure by Letters Patent:
1. A bushing-sleeve combination for a vibration-isolating mounting, said combination, when in a relaxed state, comprising
 a resilient elastomer bushing including an elongated cylindrical body portion having a sidewall, a flange portion integral with said body portion radiating outwardly therefrom adjacent one end of the body portion, a tapered portion joined to said body portion adjacent the other end thereof having an outer surface which decreases in diameter progressing axially away from said body portion, said tapered portion having a length which is greater than the thickness of said sidewall, and a continuous, uniform-diameter bore extending axially the entire length of the bushing, and an elongated, cylindrical, rigid, hollow sleeve of uniform outside diameter fixably received within said bore, with one end of the sleeve being substantially coplanar with that surface of said flange portion which faces axially away from said body portion, said sleeve having an axial length less than that of said bore.

2. A bushing-sleeve combination for a vibration-isolating mounting, said combination, when in a relaxed state, comprising a resilient elastomer bushing including an elongate, cylindrical body portion having a first mean radius and a sidewall, a flange portion integral with said body portion radiating outwardly therefrom adjacent one end of the body portion, a load-directing chamferred portion joined to said body portion adjacent the other end thereof having an outer surface which decreases in diameter progressing axially away from said body portion and further having a mean radius less than said first mean radius, said chamferred portion having a length which is greater than the thickness of said sidewall, and a continuous, uniform-diameter bore extending axially the entire length of the bushing, and an elongate, cylindrical, rigid, hollow sleeve of uniform outside diameter received within said bore, with one end of said sleeve being substantially coplanar with that surface of said flange portion which faces axially away from said body portion, said sleeve having an axial length less than that of said bore, said sleeve being fixably bonded to said bushing adjacent said flange portion, said bond extending less than the entire axial length of said sleeve.

* * * * *